(12) United States Patent  (10) Patent No.: US 9,003,138 B1
Natanzon et al.  (45) Date of Patent: *Apr. 7, 2015

(54) READ SIGNATURE COMMAND

(75) Inventors: Assaf Natanzon, Ramat-Gan (IL); Dennis T. Duprey, Raleigh, NC (US); Karl M. Owen, Chapel Hill, NC (US); Leehod Baruch, Rishon Leziyon (IL); Jehuda Shemer, Kfar Saba (IL)

(73) Assignee: EMC Corporation, Hopkinton, MA (US)

( * ) Notice: Subject to any disclaimer, the term of this patent is extended or adjusted under 35 U.S.C. 154(b) by 711 days.

This patent is subject to a terminal disclaimer.

(21) Appl. No.: 13/174,384

(22) Filed: Jun. 30, 2011

(51) Int. Cl.
*G06F 12/00* (2006.01)
*G06F 9/46* (2006.01)

(52) U.S. Cl.
CPC ........................................ *G06F 9/46* (2013.01)

(58) Field of Classification Search
None
See application file for complete search history.

(56) References Cited

U.S. PATENT DOCUMENTS

| 7,882,286 B1* | 2/2011 | Natanzon et al. ................ 710/74 |
| 2010/0031086 A1* | 2/2010 | Leppard .......................... 714/15 |
| 2010/0077013 A1* | 3/2010 | Clements et al. .............. 707/822 |

\* cited by examiner

*Primary Examiner* — Baboucarr Faal
(74) *Attorney, Agent, or Firm* — Krishnendu Gupta; Joseph D'Angelo

(57) ABSTRACT

A method, system, and computer program product for providing a first site the ability to execute a read signature command, wherein the read signature command takes a set of arguments, wherein at least one of the arguments corresponds to at least a portion of the first storage medium, and returns a signature value for the at least a portion of the storage medium.

23 Claims, 13 Drawing Sheets

READ SIGNATURE
(LUN, LBA, BLOCKS, GRANULARITY)
310

FIG. 3

READ SIGNATURE COMMAND

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to co-pending US Patent Application, filed Sep. 28, 2009, Ser. No. 12/568,203 entitled "ENSURING CONSISTENCY OF REPLICATED VOLUMES" which is hereby incorporated by reference in its entirety.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for providing a first site the ability to execute a read signature command, wherein the read signature command takes a set of arguments, wherein at least one of the arguments corresponds to at least a portion of the first storage medium, and returns a signature value for the at least a portion of the storage medium.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 3 is a simplified illustration of a read signature command, in accordance with an embodiment of the present disclosure;

DETAILED DESCRIPTION

Figure 1:
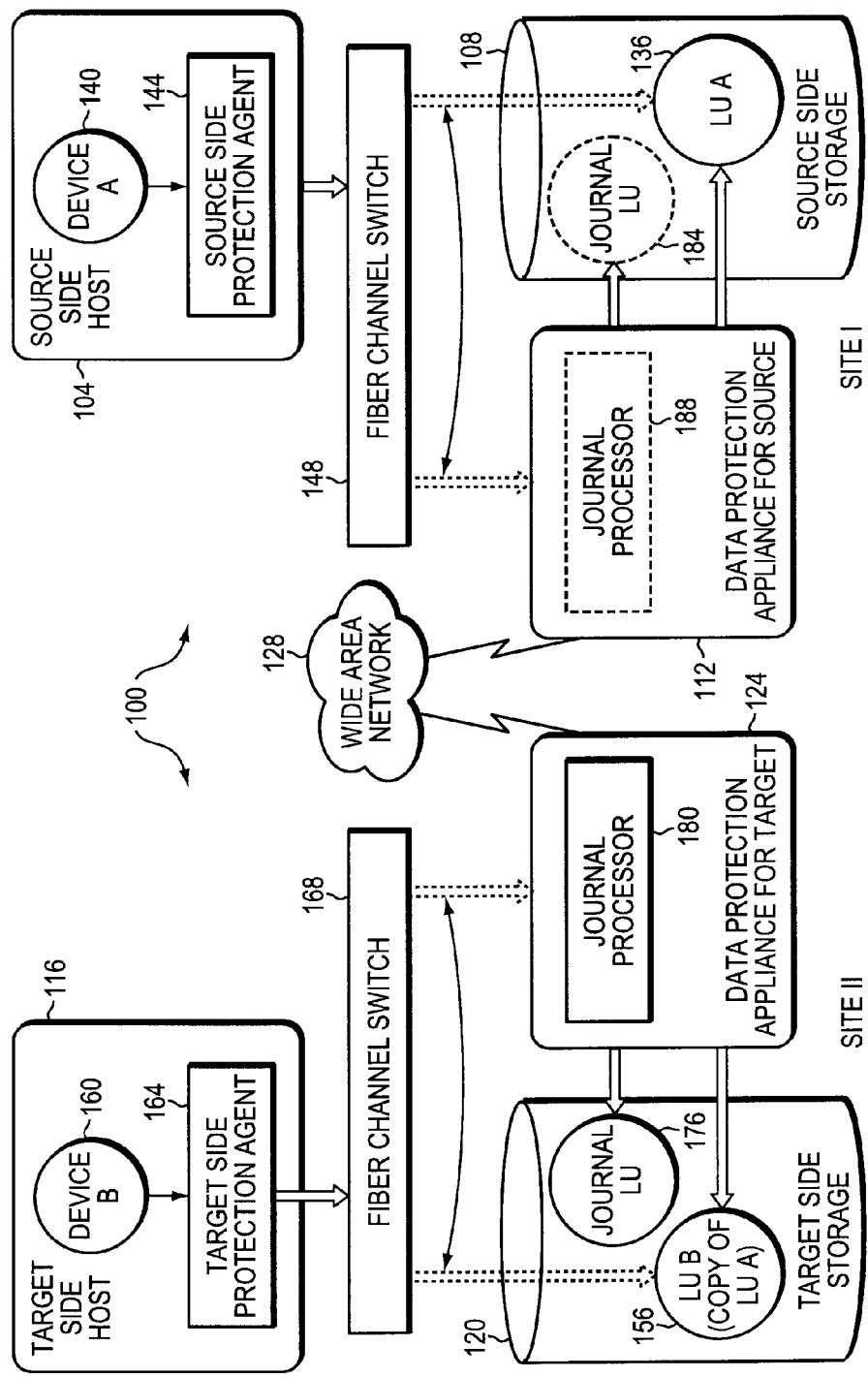
FIG. 1 is a simplified illustration of a data protection system, in accordance with an embodiment of the present disclosure.

In an embodiment of the current disclosure, a read signature command may be added to a storage device. In certain embodiments, the read signature command may have a LUN, LBA, and number of blocks as parameters and may return a 16 or 32 byte signature for each unit of blocks (e.g. each 8 or 64 KB). In some embodiments, the storage may keep the signatures persistently. In other embodiments, the signatures may be computed on demand. In other embodiments, the storage may compute the signatures and store them persistently in an asynchronous way. In further embodiments, each write to a block may invalidate a signature. In some embodiments, using the signatures may enable full silvering to be performed about 500 times faster than traditional silvering, since there is almost no data transfer. In still further embodiments, a periodic consistency and verification check may be run on volumes and their replicas.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes.

Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface.

Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA. Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124. In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
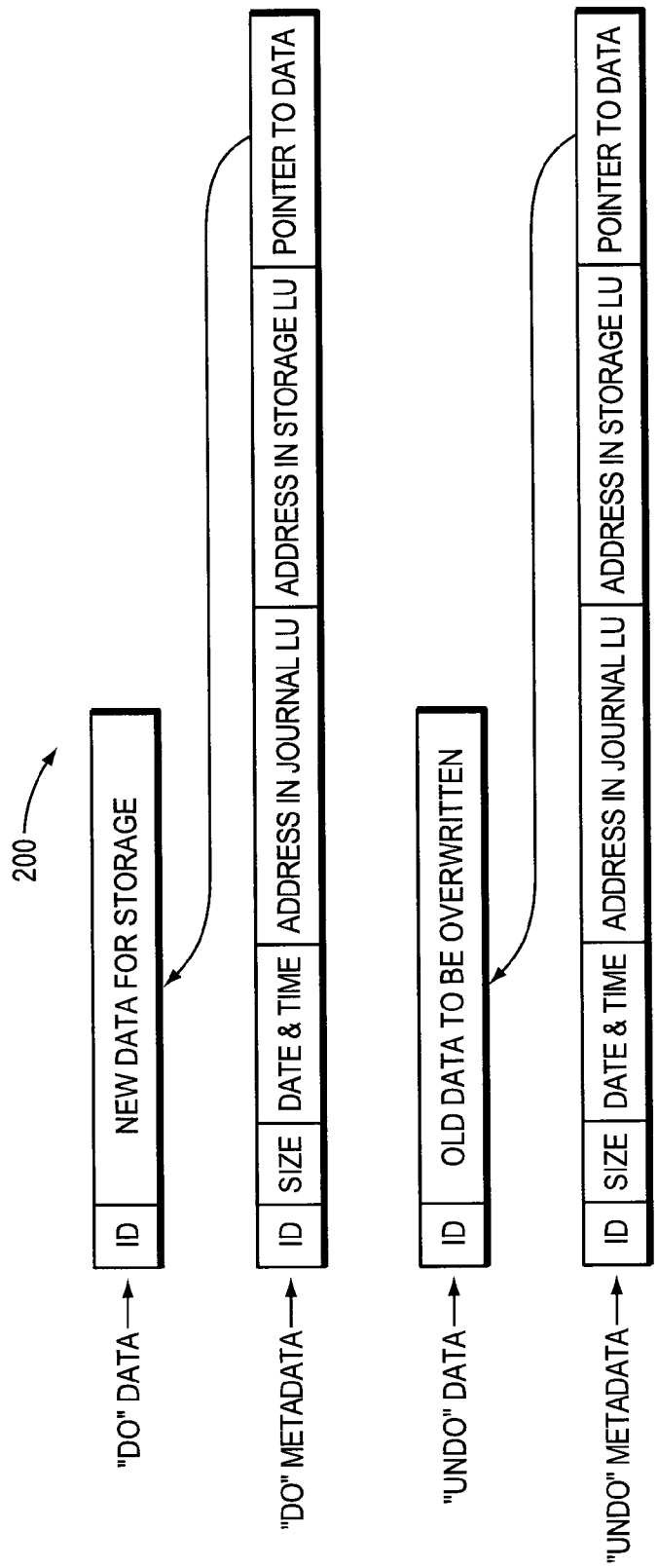
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time.

Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group may contain one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter minors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWER-PATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system may roll backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site may no longer be needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Read Signature

In an embodiment, the current disclosure may enable read signatures for a storage device. A read signature may take a set of parameters and return a signature or hash value for those set of parameters. In some embodiments, the set of parameters may include a range. In certain embodiments the read signature may include a LUN. In at least some embodiments, the read signature command may include an LBA. In further embodiments, the read signature may have different ranges of data. In some embodiments, the read signature may return a hash value for the specified set of parameters. In most embodiments, comparing to signatures of a set of data may provide a way to determine if two sets of data are equivalent. In certain embodiments, the read signature may be implemented as a SCSI command.

In some embodiments, the signature may be calculated and stored with the data. In alternative embodiments, multiple signatures may be stored for data, each signature representing a different granularity of the data (i.e. there may be a signature for every 16 kb chunk as well as a signature for the megabyte chunk). In certain embodiments, when a write IO arrives, it may invalidate a stored signature for the location of the write IO. In other embodiments, a background process may update signatures that are out of date.

In an embodiment, the read signature command may be used in initialization of a storage system. In some embodiments, read signature commands may be performed on the data of the production site. In certain embodiments, the read signatures may be sent to the replication site. In further embodiments, the replication site may perform read signature commands. In at least some embodiments, the signatures of the replication site and production site may be compared to determine if the data is equivalent on the production and replication sites.

In alternative embodiments, the read signature may be performed on data of different block sizes. In some embodiments, the read signatures may be of size 8 kb. In other embodiments, the read signature size may be 16 kb. In further embodiments, the read signature size may be 1 megabyte. In still further embodiments, the read signature command may contain offsets and lengths of the data. In still further embodiments, the read signature commands may be used to verify data during a disaster recovery. In some embodiments, a read signature for a large data block may be used when the majority of the data is the same. In other embodiments, when the data signatures of large data blocks on the replication and production site are found to not be the same, smaller read signatures may be used to determine what portion of the data is out of sync.

In further embodiments, IO may be occurring contemporaneously with the comparison of the read signatures. In certain embodiments, when two signatures are compared and are not equal, further steps may be taken to determine if IO occurred to make the read signatures not be equivalent. In some embodiments, the signature may be used for verifying replication integrity. In another embodiment, the signature may be used for verification and initialization. In other embodiments, either the production or replication site may not support the read signature command. In the embodiments where one site does not support the command, the data may be read and the signature may be calculated.

Figure 4:
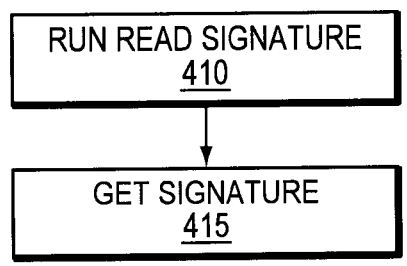
FIG. 4 is a simplified illustration of a method of executing a read signature, in accordance with an embodiment of the present disclosure.

Refer now to the example embodiments of FIGS. 3 and 4. A read signature command 310 may be run (step 410). In this example embodiment, Read signature 310 command includes a LUN, an LBA, and a block range, and signature granularity (i.e. a request may be made for 1 MB of data in granularity of a signature for each 8 KB which would return 128 signatures). Read Signature command 310 may return a signature (step 415).

In some embodiments, the signature command may be used to accelerate the aforementioned initialization process. In certain embodiments, the initialization process may read all the locations which are marked as dirty in the delta marker stream and transfers the data to the replica site. In most embodiments, before transferring the data, the initialization process may check if the replica site already has the relevant data, if the data already exist at the replica site may not send the data. In certain embodiments, the first time the system initialized, all the locations may be marked as dirty in the delta marker stream. In some embodiments, the read signatures command may allow the data at the production and replica site to be checked to determine if the data is identical without actually reading the data.

Figure 5:
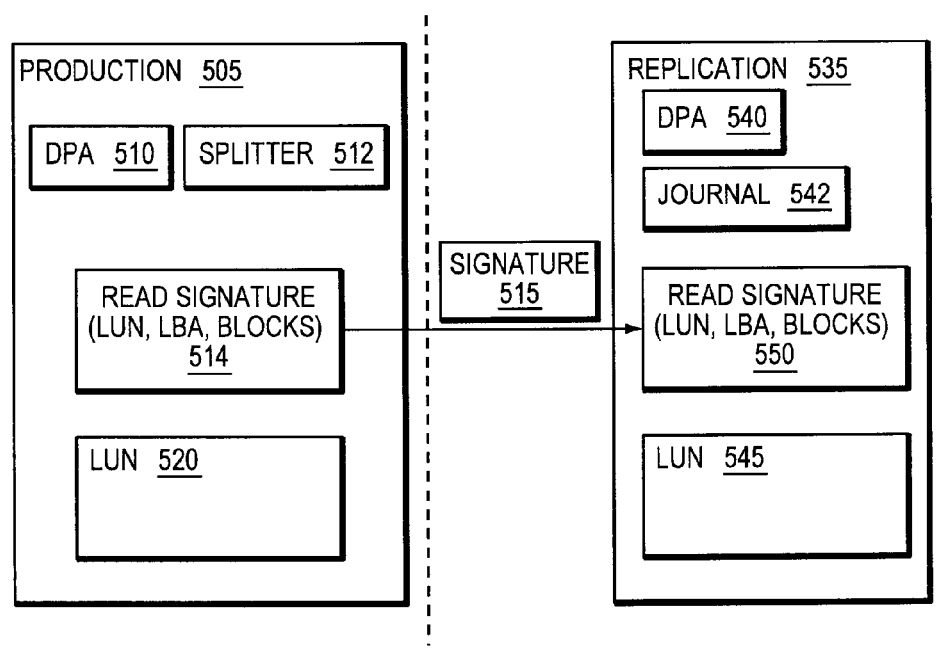
FIG. 5 is a simplified illustration of a production site executing a read signature command and sending the signature to a replication site, in accordance with an embodiment of the present disclosure.
Figure 6:
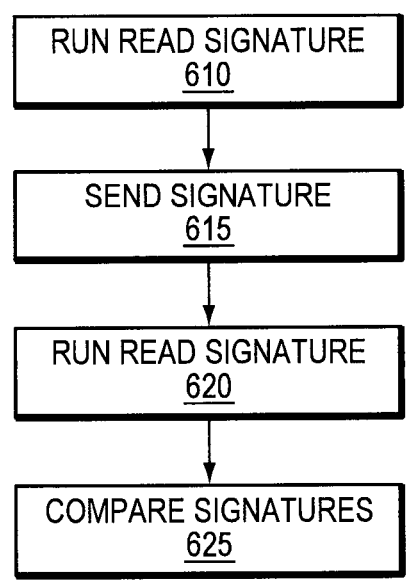
FIG. 6 is a simplified illustration of a method of using read signatures, in accordance with an embodiment of the present disclosure.

Refer now to the example embodiments of FIGS. 5 and 6. Production site 505 may have LUN 520. LUN 520 may have one or more sets of blocks. Read Signature command 514 may be run (step 610). Signature 515 may be sent to replication site 535 (step 615). Read Signature command 550 may be run (step 620) at replication site 535. Signature 515 and the resulting signature from read signature 550 may be compared (step 625).

Figure 7:
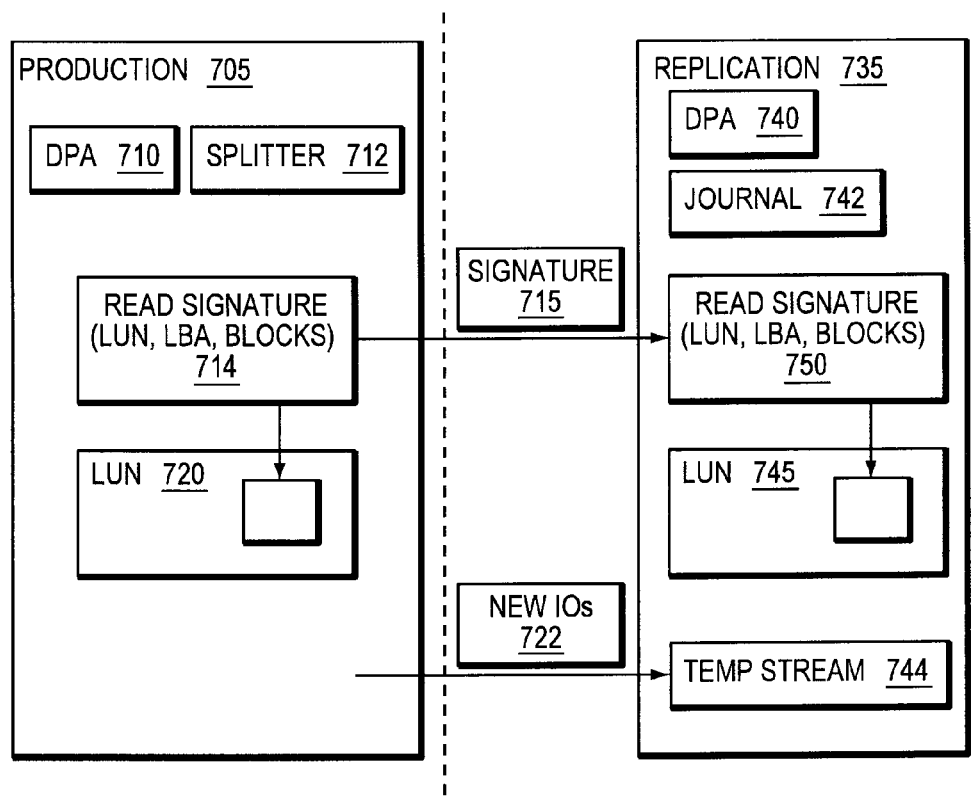
FIG. 7 is a simplified illustration of an alternative embodiment of a production site executing a read signature command and sending the signature to a replication site, in accordance with an embodiment of the present disclosure.
Figure 8:
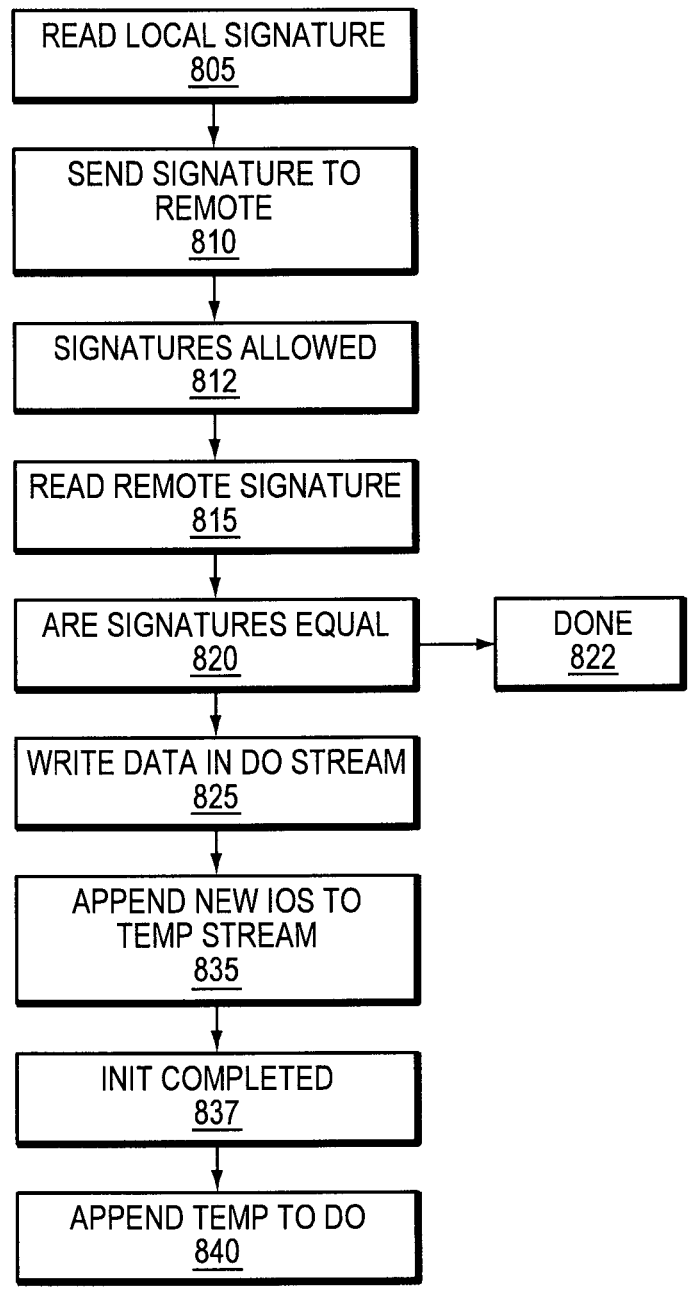
FIG. 8 is a simplified illustration of an alternative method of using read signatures, in accordance with an embodiment of the present disclosure.

Refer now to the example embodiments of FIGS. 7 and 8. A read signature command 714 for LUN 720 of Production site 705 may be executed (step 805). Read signature 715 may be sent to the remote site 735 (step 815). The remote site may check if reading signature for the specific location is allowed (step 812). In certain embodiments there may be locations in the do stream which contain data from sessions before the current initialization, which have not yet been applied to the replica volumes. In these embodiments, for such locations, it may not be possible to use remote signature directly from the replica journal.

If signatures are allowed at the replica site for the specific location, a read signature command 750 for the data may be executed on the remote site 735 (step 815). The signatures may be compared (step 820). If the signatures are equivalent, the data is verified (step 822).

If the signatures are not equivalent, data may be read from the production site 805 and sent to do stream in journal 742 on the replication site 735 (step 825). Open IOs may be flushed (step 830). In some embodiments, the process of verifying the locations suspected as different between the production and replica may occur while new IOs arrive to the production LU. New, incoming, IOs 722 may be written to temporary stream 744 (step 835). After the initialization, process is complete, the IOs in temporary stream 744 may be added to the DO stream in journal 742 (step 840).

Figure 9:
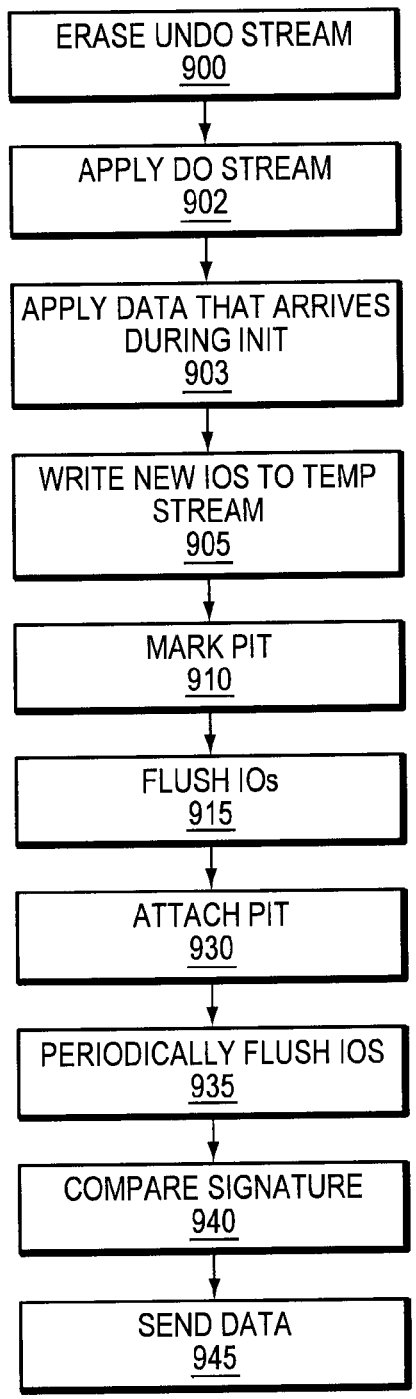
FIG. 9 is a simplified illustration of an further alternative method of using read signatures, in accordance with an embodiment of the present disclosure.

Refer now to the example embodiments, of FIGS. 7 and 9. In these examples, there may not be enough space in the Do and undo streams of journal 742 to perform the initialization In the example embodiments of FIGS. 7 and 9, system moves to a special mode of initialization, where there may not be a consistent point in time available. The Undo stream is erased (step 900). Data from the do stream is applied to the replica volumes (step 902). Once all data from previous sessions in do stream is applied to the remote storage, (i.e. all data that was not written to the do stream in the current initialization process), the system may start applying the data arriving from the initialization process directly to the remote replica (step 903). IOs containing new data arrive to temporary stream (step 905). Periodically, splitter marks a point in time (step 910) The splitter flushes all open IOs (step 915). All IOs associated with the flush, i.e. IOs which completed before the flush time, may be marked with the PIT (step 930). The system applies new IOS from the temporary stream, which arrived before the flush point to the replica volume, allowing the system to transfer the data from the temporary stream to the replica volume while initialization process still running.

During the initialization process the system reads the signature (step 940) for every location suspected as dirty, if the system is allowed to read signature at the replica site (i.e. either all do stream data applied to the journal or the location is not marked in the do stream), the system reads the signature of the data at the replica site, and only if the signature read is not allowed or signatures are not identical the production site sends the initialization data to the replica site (step 945).

Figure 10:
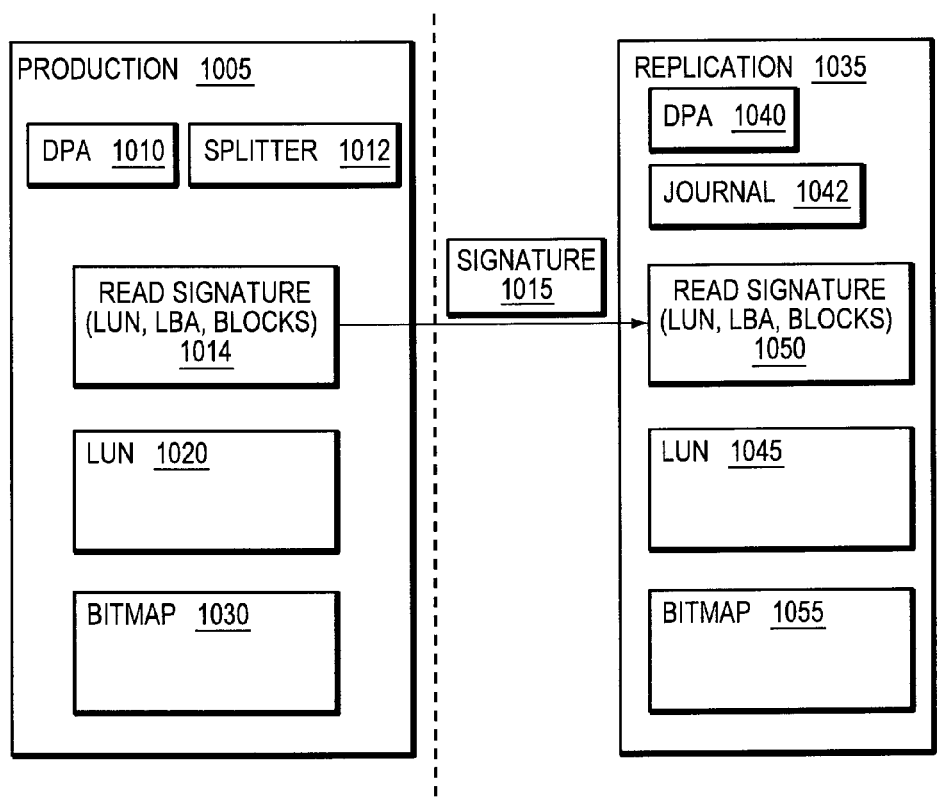
FIG. 10 is a simplified illustration of an alternative embodiment of a production site with a bitmap executing a read signature command and sending the signature to a replication site with a bitmap, in accordance with an embodiment of the present disclosure.
Figure 11:
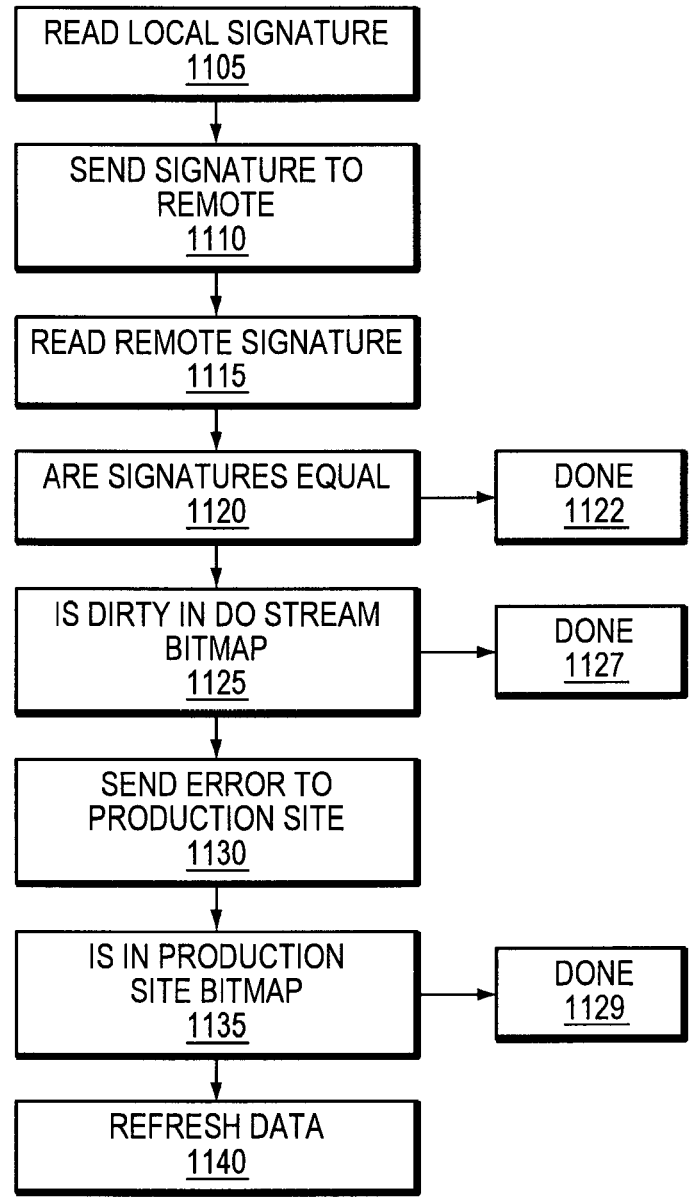
FIG. 11 is a simplified illustration of a method of using read signatures with bitmaps, in accordance with an embodiment of the present disclosure.

In other embodiments, the read signatures command may enable a replication system to perform a consistency check of the replica while IOs continue to arrive from the production volume. Refer now to the example embodiments of FIGS. 10 and 11. In the example embodiments of FIGS. 10 and 11 an integrity check is being performed. In the embodiments of FIGS. 10 and 11, there is dirty bitmap 1030 on production site 1005 and a dirty bitmap 1055 on replication site 1035. The bitmaps, 1030 and 1055, track changes that have occurred but may not have been entered on replication LUN 1045. For example, if IO is in the do stream of journal 1042, but has not been written to LUN 1045, then the replication bitmap 1055 may track this change. If the data has been changed on production site 1005 but has not been sent to or entered on replication site 1035, then production bitmap 1030 may track this change. In certain embodiments, to perform a full integrity check of a replicated volume, the system may try to compare the data of the volume between the two sites.

In the example embodiments of FIGS. 10 and 11, a read signature 1014 is performed on the production site 1005 (step 1105). Signature 1015 from read signature 1014 is sent to the remote or replication site 1035 (step 1110). Read signature command 1050 is read at the remote or replication site 1035 (step 1115). A determination is made if the signatures are equal (step 1120). If the signatures are equal the process is complete and the system may move to checking the next set of blocks. (step 1122).

If the signatures are not equal, replication bitmap 1055 is examined to see if the location corresponding to the signatures is in the bitmap 1055 (step 1125). If it is in bitmap 1055, the process is done (step 1127). If it is not in bitmap 1055, an error is sent to the production site 1005 (step 1130). Production bitmap 1030 is examined to see if the location is in production bitmap 1030 (step 1135). If it is in production bitmap 1030, the process is done (step 1129). If it is not in production site bitmap 1030, the data may not be the same and may need to be refreshed (step 1140). If integrity check fails, integrity check may stop with an error, or system may automatically read suspected area from the disk and sent it to the replica site to fix the corruption.

Figure 12:
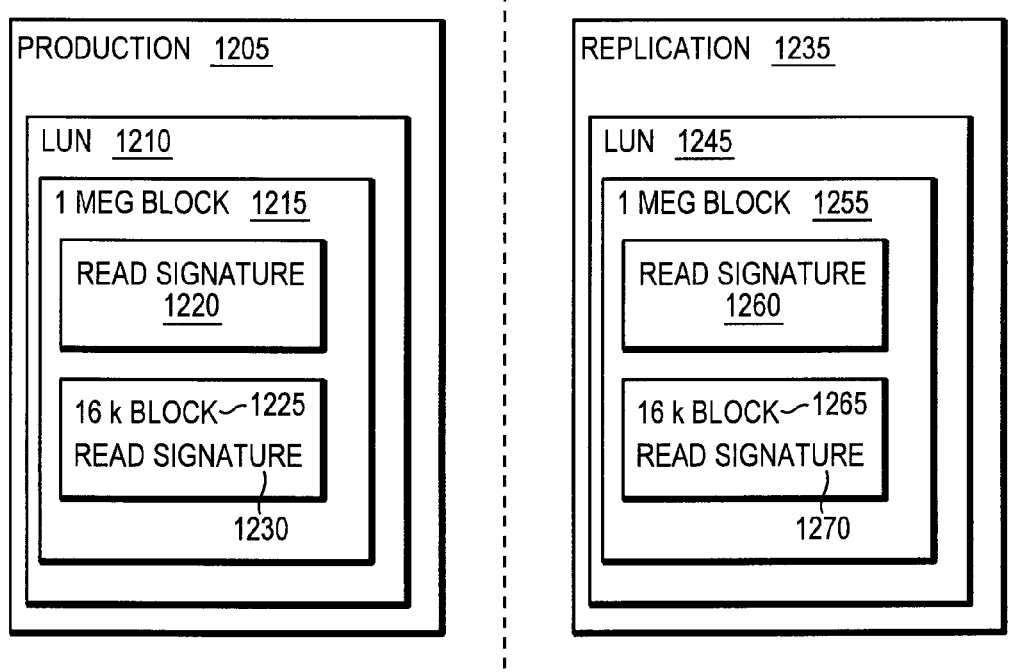
FIG. 12 is a simplified illustration of an alternative embodiment of a production site with multiple read signatures and a replication site with multiple read signatures, in accordance with an embodiment of the present disclosure.

In some embodiments, the read signature command may be executed in a coarse granularity such as requesting a signature for a 10 mb block. In certain embodiments, signatures for such a large block may be used to quickly compare production and replication data to ensure consistency. In other embodiments, if a signature comparison for a coarse block, such as 10 mb, is not equal then that block may be divided up into sub block such as 1mg and the signature for these 10 1 mb sub blocks may be compared to determine what portion of the 10 mb is not equivalent. In further embodiments, this process may be repeated to identify the portions of the data which is not equivalent. In alternative embodiments, each of these signatures may be calculated and stored with the LUN data. In other alternative embodiments, this data may be recalculated on demand. In still further embodiments, a stored signature may be recalculated automatically when a write is sent to a particular area of the LUN Refer now to the example embodiment of FIG. 12. FIG. 12 illustrates a production site 120 and a replication site 1235 with signatures of different sizes for different data sizes on LUN 1210. LUN 1210 has 1 megabyte block 1215. For block 1215 LUN 1210 has read signature 1220. LUN 1210 may also be partitioned to 16 k blocks 1225 which are part of block 1215. Each 16 k block 1225 may have signature 1230. LUN 1245 has 1 megabyte block 1255. For block 1255 LUN 1245 has read signature 1260. LUN 1245 may also be partitioned to 16 k block 1265 which is part of block 1215. Each 16 KB block 1265 has read signature 1270. In FIG. 12, these signatures are stored on production 1205 and replication 1235 sites, the signatures may also be calculated on demand when the read signature command arrives. If a comparison is performed, read signatures 1220 and 1260 may be compared to determine if the blocks are equivalent. If the blocks are not equivalent, signatures 1230 and 1270 may be compared to determine if blocks 1225 and 1265 are equivalent.

Figure 13:
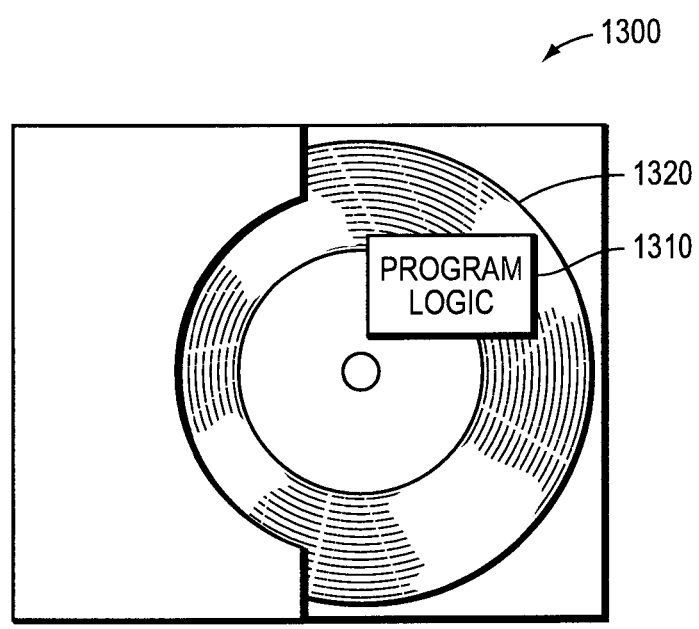
FIG. 13 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 13 shows Program Logic 1310 embodied on a computer-readable medium 1530 as shown, and wherein the Logic is encoded in computer-executable code configured for carrying out the reservation service process of this invention and thereby forming a Computer Program Product 1300.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for data replication, the system comprising:
a first site, the first site comprising a first storage medium; and
computer-executable logic operating in memory, wherein the computer-executable program logic is configured for execution of:
providing the first site the ability to execute a read signature command, wherein the read signature command takes a set of arguments, wherein at least one of the arguments corresponds to at least a portion of the first storage medium, and returns a signature value for the at least a portion of the storage medium;
storing a read signature value for at least a portion of the storage medium;
upon execution of the read signature command, returning a stored signature value corresponding to a calculated return value; and
invalidating the stored read signature value upon a write to the data stored at the at least a portion of the first storage medium.

2. The system of claim 1 wherein the computer-executable program logic is further configured for the execution of:
upon execution of the read signature command, calculating the return value of the at least a portion of the first storage medium.

3. The system of claim 1 wherein the computer executable program logic is further configured for the execution of:
determining that a read signature value has been invalidated; and refreshing the invalidated read signature value.

4. The system of claim 1 further comprising:
a second site comprising a second storage medium; and
wherein the computer-executable program logic is further configured for execution of:
executing the read signature command at the first site to get a first signature;
sending the signature from the first site to the second site;
executing a read signature command at the second site to get a second signature;
comparing the first signature and the second storage signature to determine if the to at least a portion of the data on the first storage medium is equivalent to the at least a portion on the second storage medium.

5. The system of claim 4
wherein the computer-executable program logic is further configured for execution of:
if the first and second signatures are not equivalent, sending the data corresponding to the read signature from the first site to the second site.

6. The system of claim 4
wherein the computer-executable program logic is further configured for execution of:
writing new IOs from the first site to a second site to a second stream during an initialization process; and
appending the second stream to the do stream when the initialization is finished.

7. The system of claim 4 wherein the computer-executable program logic is further configured for execution of:
using the executing of the read signature command to determine consistency between the first storage medium and the second storage medium while replicating from the first storage medium to the second storage medium in a journal based replication.

8. The system of claim 4 wherein the computer-executable program logic is further configured for execution of:
creating a replication bitmap of data in the do stream at second site;
creating a production bitmap at the production site;
updating the replication bitmap if a write arrives to the replication site;
if the first signature is not equivalent to the second signature, examining the bitmaps to determine if the location corresponding to non-equivalent signatures is marked in the production bitmap or the replication bitmap; and
based on a determination that the location corresponding to non-equivalent signatures is not in the bitmaps, determining that data corruption has occurred.

9. The system of claim 4, wherein the computer-executable program logic is further configured for execution of:
based on a determination that data corruption has occurred, refreshing the corrupted data based on a user configuration.

10. A computer implemented method for use data replication, the method comprising:
providing a first site the ability to execute a read signature command, wherein the read signature command takes a set of arguments, wherein at least one of the arguments corresponds to at least a portion of the first storage medium, and returns a signature value for the at least a portion of the storage medium;
storing a read signature value for at least a portion of the storage medium;
upon execution of the read signature command, returning a stored signature value corresponding to a calculated return value; and
invalidating the stored read signature value upon a write to the data stored at the at least a portion of the first storage medium.

11. The method of claim 10 further comprising:
upon execution of the read signature command, calculating the return value of the at least a portion of the first storage medium.

12. The method of claim 10 further comprising:
determining that a read signature value has been invalidated; and
refreshing the invalidated read signature value.

13. The method of claim 10 further comprising:
executing the read signature command at the first site to get a first signature;
sending the signature from the first site to a second site;
executing a read signature command at the second site to get a second signature;
comparing the first signature and the second storage signature to determine if the to at least a portion of the data on the first storage medium is equivalent to the at least a portion of a second storage medium on the second site.

14. The method of claim 13 further comprising:
if the first and second signatures are not equivalent, sending the data corresponding to the read signature from the first site to the second site.

15. The method of claim 13 further comprising:
wherein the computer-executable program logic is further configured for execution of:
writing new IOs from the first site to a second site to a second stream during an initialization process; and
appending the second stream to the do stream when the initialization is finished.

16. The method of claim 13 further comprising:
using the executing of the read signature command to determine consistency between the first storage medium and the second storage medium while replicating from the first storage medium to the second storage medium in a journal based replication.

17. A computer program product for use in replication for comprising:
a non-transitory computer readable medium encoded with computer executable program code for using read signatures in replication, the code configured to enable the execution of:
providing a first site the ability to execute a read signature command, wherein the read signature command takes a set of arguments, wherein at least one of the arguments corresponds to at least a portion of the first storage medium, and returns a signature value for the at least a portion of the storage medium;
storing a read signature value for at least a portion of the storage medium;
upon execution of the read signature command, returning a stored signature value corresponding to a calculated return value; and
invalidating the stored read signature value upon a write to the data stored at the at least a portion of the first storage medium.

18. The computer program product of claim 17, the code further configured to enable the execution of:
calculating, upon execution of the read signature command, the return value of the at least a portion of the first storage medium.

19. The computer program product of claim 17, the code further configured to enable the execution of:
determining that a read signature value has been invalidated; and
refreshing the invalidated read signature value.

20. The computer program product of claim 17, the code further configured to enable the execution of:
executing the read signature command at the first site to get a first signature;
sending the signature from the first site to a second site;
executing a read signature command at the second site to get a second signature;
comparing the first signature and the second storage signature to determine if the to at least a portion of the data on the first storage medium is equivalent to the at least a portion of a second storage medium on the second site.

21. The computer program product of claim 20, the code further configured to enable the execution of:
if the first and second signatures are not equivalent, sending the data corresponding to the read signature from the first site to the second site.

22. The computer program product of claim 20, the code further configured to enable the execution of:
wherein the computer-executable program logic is further configured for execution of:
writing new IOs from the first site to a second site to a second stream during an initialization process; and
appending the second stream to the do stream when the initialization is finished.

23. The computer program product of claim 20, the code further configured to enable the execution of:
using the executing of the read signature command to determine consistency between the first storage medium and the second storage medium while replicating from the first storage medium to the second storage medium in a journal based replication.

* * * * *